United States Patent

Goyarts

[15] 3,698,581
[45] Oct. 17, 1972

[54] VAN CARRIER VEHICLE

[72] Inventor: Wynand M. J. M. Goyarts, Battle Creek, Mich.

[73] Assignee: Clark Equipment Company

[22] Filed: Feb. 16, 1971

[21] Appl. No.: 115,457

[52] U.S. Cl. .................................. 214/394, 212/14
[51] Int. Cl. ............................................. B60p 1/64
[58] Field of Search ..214/390, 392, 394, 396; 212/8, 212/9, 14; 294/67 R, 67 BC, 67 D, 67 DA, 67 DC

[56] References Cited

UNITED STATES PATENTS

| 3,468,440 | 9/1969 | Poole | 214/390 |
| 2,672,247 | 3/1954 | Jewett | 214/392 X |

FOREIGN PATENTS OR APPLICATIONS

| 901,517 | 1/1954 | Germany | 214/390 |
| 872,432 | 4/1953 | Germany | 214/390 |

*Primary Examiner*—Albert J. Makay
*Attorney*—Kenneth C. Witt, John C. Wiessler, Robert H. Johnson and Lewis J. Lamm

[57] ABSTRACT

A self-propelled van carrier vehicle having a rearwardly opening U-shaped chassis on the legs of which are located a pair of short stroke hydraulic cylinders for actuating longitudinally extending U-shaped opposed lift levers. Depending from the lift levers is a lifting frame which is adapted to engage, lift and transport large containers and to stack them at least two deep. Operator controlled adjustable means is provided between the lifting frame and the lever arms for adjusting the lifting frame transversely of the vehicle or skewing it in relation to the vehicle. Improved mechanical load distribution means is operative to aid in equalizing the effective load both transversely and longitudinally of the vehicle when the load as supported on the lifting frame is eccentric or offset in any direction in relation to the center of gravity of the lifting frame.

12 Claims, 5 Drawing Figures

INVENTOR
WYNAND M. J. M. GOYARTS

ATTORNEY

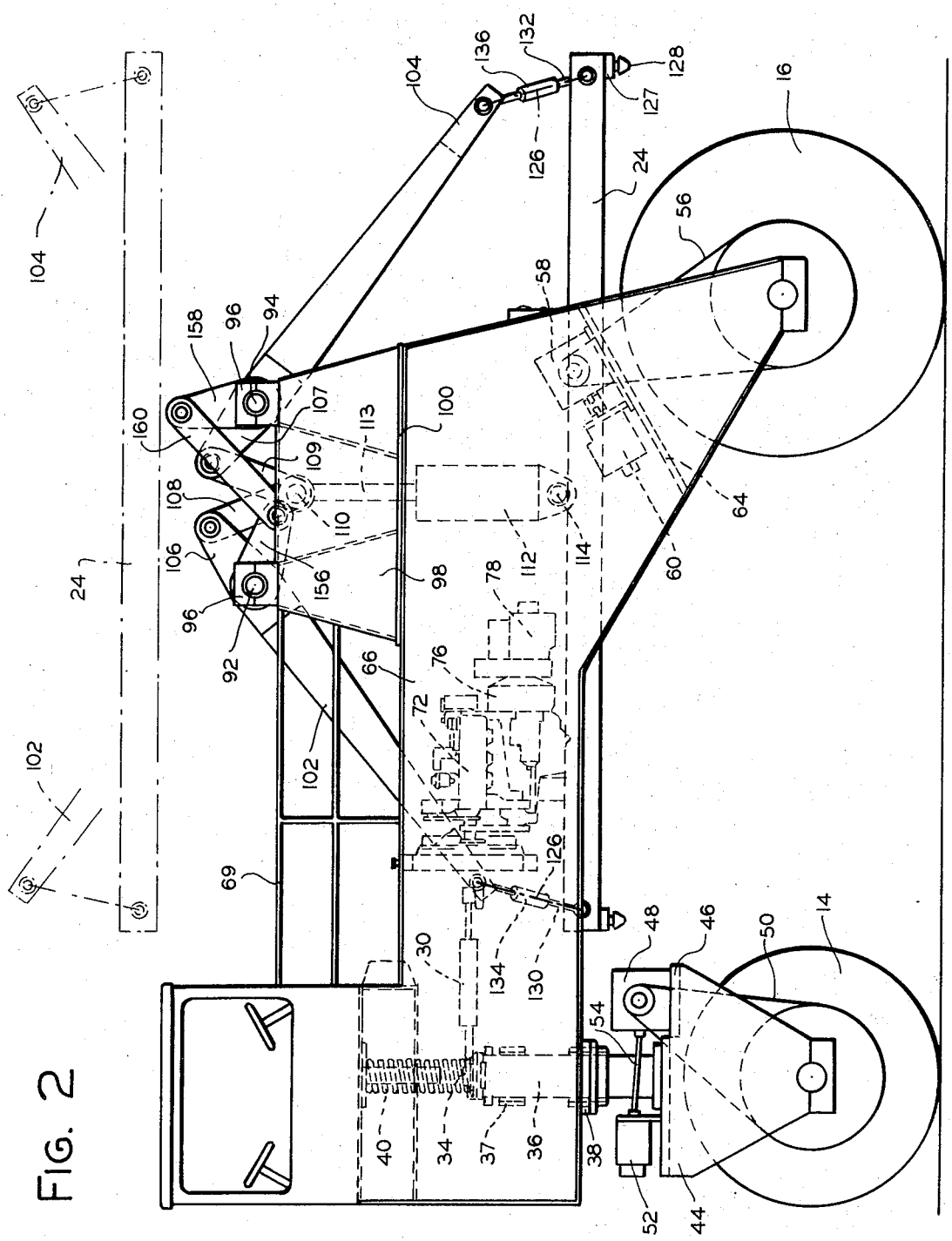

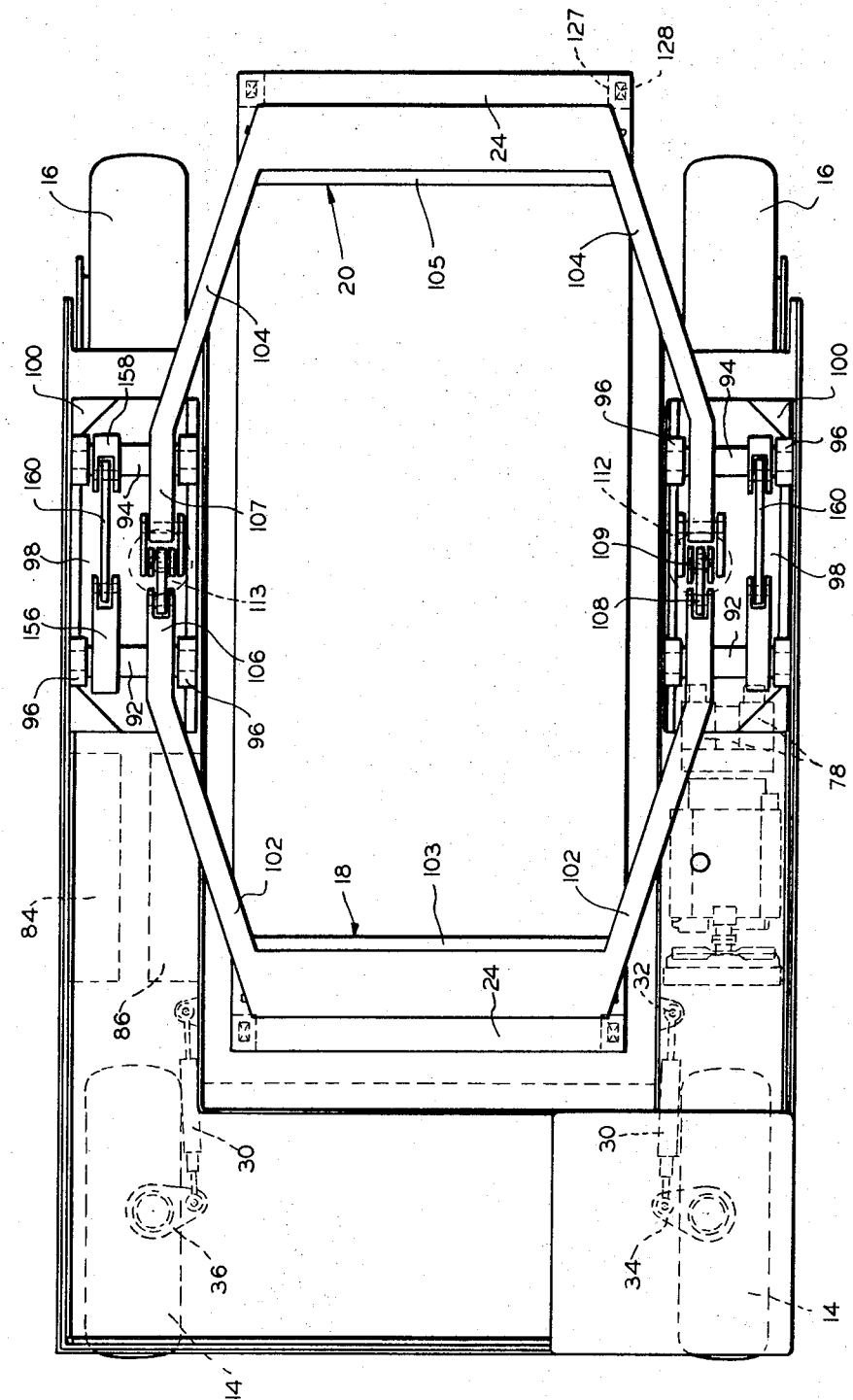

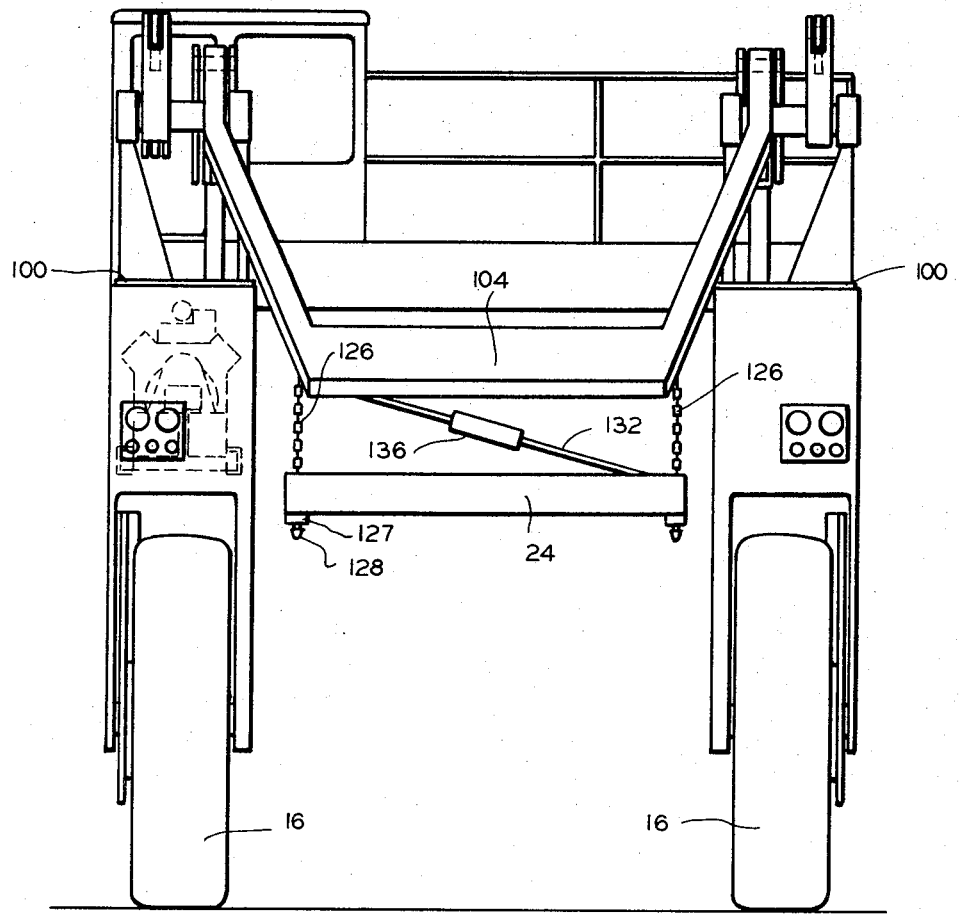

VAN CARRIER VEHICLE

BACKGROUND OF THE INVENTION

The field of art to which the invention pertains includes container handling equipment.

With the advent of large van and container handling system concepts, sometimes referred to as "containerization" in the industry, came the need for specialized vehicles adapted to efficiently handle and transport van size containers between major freight transport facilities such as railroads, overland trucks, cargo airplanes, and ships. Inventions relating to van carrier vehicles for use in such systems appear, for example, in U. S. Pat. Nos. 3,146,903 and 3,387,726.

The present invention concerns improvements in such vehicles as are capable of straddling a van size container, engaging the container by novel lifting mechanism and raising it to a relatively high elevation.

The lifting mechanism is relatively low in cost, and of a rugged and highly efficient design which provides substantial improvements over prior such mechanisms, including improved means for engaging vans or containers which may be misaligned in relation to the open bay of the vehicle, for elevating the container, and for substantially equalizing the distribution of the load in relation to the lifting mechanism both laterally and longitudinally of the van carrier even though the container load is asymmetric in relation to the lifting mechanism.

SUMMARY

My invention resides in a container handling vehicle structure which includes a much simplified and relatively low cost container handling mechanism capable of engaging, elevating and manipulating as required a container. Within the concept is improved means for adjusting a container engaging or lifting frame in a plurality of directions, and an improved mechanical device which effects substantially equal distribution of a container load on the vehicle.

Accordingly, it is a primary object of the invention to provide significant improvements in material handling vehicles for use in transporting large van containers and the like.

It is another object to provide in vehicles of the type contemplated an improved container engaging and lifting means.

BRIEF DESCRIPTION OF THE DRAWING

FIG. 2 is a side elevational view of the vehicle shown in FIG. 1;

FIG. 3 is a plan view of FIG. 2;

FIG. 4 is a rear end view of FIG. 2; and

DESCRIPTION OF THE PREFERRED EMBODIMENT

Figure 1:
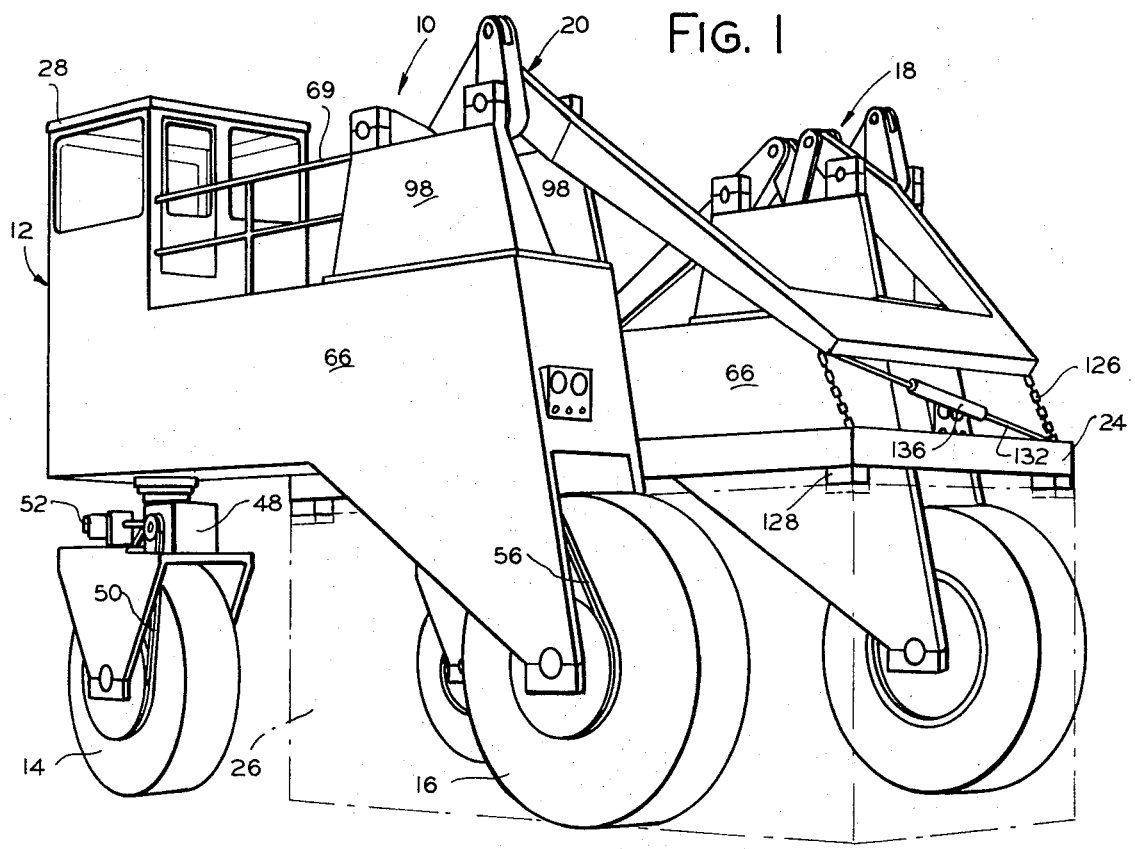
FIG. 1 is a perspective view of a vehicle which embodies my invention.

Referring to the drawing, a van carrier or container handling vehicle which embodies my invention is shown at numeral 10. It comprises a rearwardly opening U-shaped frame 12 supported from pairs of forward steer drive wheels 14 and rearward drive wheels 16 and has mounted near the rear ends of the legs of the U-shaped frame hydraulically actuated U-shaped lifting arms 18 and 20. As will be described in greater detail below, the lifting arm assemblies 18 and 20 extend in opposite directions from connections thereof to actuators which are adapted to lift and lower the arms arcuately in opposite directions which in turn lifts and lowers a lifting frame 24 in a horizontal attitude. Lifting frame 24 is supported from the corner portions of the lifting arms and is adapted to engage and elevate a van or container 26 in the open bay of the vehicle which then transports it to a desired location.

An operator's station is enclosed within a cab 28 at the front left corner portion of the vehicle, in which are located the usual controls for driving and steering the vehicle, and for operating the container handling mechanism. Dirigible wheels 14 are operated by a power steering system which includes a pair of power cylinders 30 connected to the chassis at 32 and to steering arms 34 which turn the wheels through steering posts 36, each of which is mounted from the frame in bearings 37 and 38. The front end of the chassis is supported from springs 40. Each wheel 14 is mounted from steering fork 44 which includes a platform 46 upon which is mounted a gear reducer 48 adapted to drive the wheel by a cable or chain 50 and a hydraulic motor 52 connected to the gear reducer by a drive shaft 54. Each non-dirigible rear wheel 16 is driven by a cable or chain 56 from a gear reducer 58 connected to a hydraulic motor 60, the gear reducer and motor being mounted from a biased platform 64 secured to the sides of a hollow box frame construction 66 forming each leg of the U-shaped vehicle chassis. Each box frame assembly 66 includes a pair of parallel side plates, and top, bottom, front and rear plates which together form each side leg assembly.

Within the left side leg assembly 66 is suitably mounted a prime mover 72, a transmission 76, and a pair of variable displacement hydraulic pumps 78 mounted side by side and connected to the front and rear pairs of hydraulic motors 52 and 60 by conduits not shown. Other accessory and control equipment ordinarily utilized with such prime mover means is, of course, intended to be embodied also in the said side leg section of the vehicle.

The lifting arm assemblies 18 and 20 of the container handling mechanism are supported from pairs of transversely spaced and axially aligned shafts 92 and 94, which pairs are spaced longitudinally of each other and each of which shafts is mounted in a pair of transversely spaced bearing blocks 96. The longitudinally spaced pairs of bearing blocks 96 which are located above each side leg 66 of the frame 12 are mounted in a support structure 98 supported from a heavy base plate 100 which is secured to and extends longitudinally of the top rear portion of each side leg structure 66.

Figure 5:
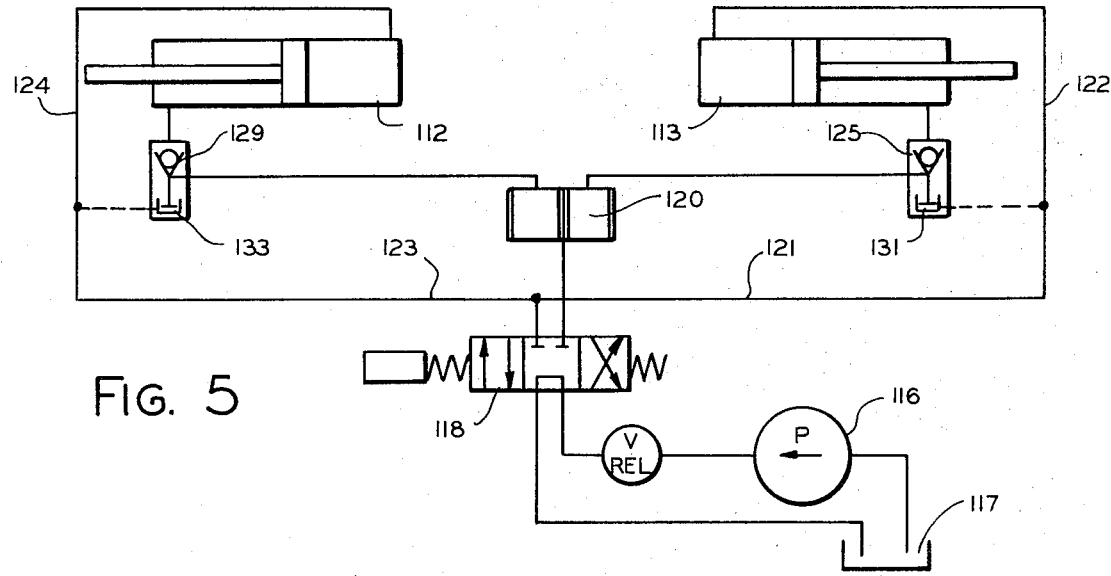
FIG. 5 is a schematic view of a hydraulic pressure supply circuit.

Lifting arm assembly 18 comprises a forwardly and transversely extending U-shaped lifting arm having a pair of forwardly extending, inwardly converging and transversely spaced leg members 102 connected at the forward ends by a transverse base member 103. Lifting arm assembly 20 comprises a rearwardly and transversely extending U-shaped lifting arm having a pair of rearwardly extending, inwardly converging and transversely spaced leg members 104 connected at the rear ends by a transverse base member 105. The ends of leg members 102 are rigidly connected to opposite ones of the pair of pivot shafts 92 and the adjacent ends of leg members 104 are rigidly secured to opposite ones of the pair of pivot shafts 94. It will be noted that each of the lifting arm assemblies 18 and 20 is mounted as a first-class lever on the respective pairs of shafts 92 and 94 and transversely of the machine. Opposed pairs of short arm portions 106 and 107 of the lever arm assemblies extend towards each other in the space between the support shafts, and the long arms of the lever arm assemblies extend in opposite directions from the said shafts. Pivotally connected to the opposed inner ends of short arm portions 106 and 107 are pairs of pivotable links 108 and 109 which are pivoted at adjacent ends to a transverse pin 110 located at the rod ends of each of a pair of relatively short stroke double-acting hydraulic cylinder and piston assemblies 112 and 113. The cylinder base end of each assembly is supported from a transverse shaft 114 mounted between the side plate members of each chassis side leg 66. An engine driven pump 116 (FIG. 5) is adapted to supply pressure fluid from a reservoir 117 to either end of cylinders 112, 113 at the operator's selection by way of a control valve 118, a fluid flow divider 120 and conduits 121, 122, 123 and 124 to actuate in synchronized raising and lowering movements the U-shaped levers from the full line down position illustrated to a position of maximum elevation as illustrated in broken lines in FIG. 2. As will be observed best in FIG. 2, the U-shaped lever arms are actuated down as the piston rods of cylinders 112 and 113 are extended and up during retraction. Check valves 125 and 129 are connected to the rod ends of the cylinders. When the head ends are pressurized the check valves remain closed to the rod ends until a pilot pressure is generated in conduits 122 and 124 to open the check valves by pilot operated pistons 131 and 133, whereupon the lift cylinders can extend as fluid in the rod ends flows to reservoir back through the flow divider and valve 118.

The lifting frame 25 is suspended in the open bay of the vehicle at the corner portions thereof by flexible means such as chains 126 which are connected at opposite ends to adjacent corner portions of lever arms 102 and 104 and which permit selective movement of the lifting frame transversely of the vehicle in either direction or in a skewing or rotative motion in either direction as may be required to facilitate the alignment of and engagement by latching assemblies 127 of the lifting frame with corner casting assemblies 128 which are located in the upper corner portions of container 26. Controlled movement of lifting frame 24 in the bay of the vehicle may be accomplished by means of adjustable rigid bars 130 and 132 connected between diagonally related corner portions of the lever arm assemblies 18 and 20 and the lifting frame so that the rigid bars extend angularly across the bay of the vehicle at both the front and rear thereof. Hydraulic actuator such as double-acting piston-cylinder assemblies 134 and 136 may be a part of each rigid bar and may be energized selectively by the operator by valve means, not shown, to extend or retract together so as to shift or adjust the frame 24 transversely in either direction within the vehicle bay, or, may be energized in opposite directions so as to rotate the lifting frame about its vertical axis in either a clockwise or a counter-clockwise direction. It will be apparent that such controlled movements of the lifting frame enable the vehicle to be aligned approximately by the operator with a container in the open bay to be engaged by the lifting frame, the latter being thereupon adjusted as required to align exactly the lifting frame with the top surface of the container whereupon the lifting frame may be lowered into locking registry with the top of the container in a well-known manner. The adjustment bars 130 and 132 may also be utilized, of course, in helping to locate precisely the container on a dock, trailer, or atop another container, for example. Corner casting assemblies 128 are adapted to cooperate with latching assemblies 127 when the lifting frame is properly located in relation to the container so that the latching assemblies engage and lock the container to the lifting frame in a well-known manner.

Distribution of the weight of a container and load on the lifting frame and on the vehicle is effected mainly by flow divider 120 which maintains under varying conditions of load, including eccentric or offset loading in respect of the transverse and longitudinal center lines of the lifting frame, an equal division of the total flow of pressure fluid to lift cylinders 112 and 113. Thus, the load will tend to be lifted in a horizontal plane irrespective of unequal distribution of a load since lift cylinders 112 and 113 will tend always to be extended and retracted by the control of the flow divider at equal rates. However, the flow divider is not capable of maintaining sufficiently accurate the vertical movement of the load in a horizontal plane, and so I have provided mechanical means which additionally tends to effect a transverse symmetrical functional distribution of the load in relation to the center lines of the lifting frame. Effective equal distribution transversely of the vehicle is accomplished by an effective transferal of an offset portion of the load through one or both lever arm assemblies 102 and 104 which function to transfer a torque force from the lift cylinder on the heavily loaded side of the container to the lift cylinder on the opposite side, thus cooperating with the flow divider to further equalize the effective load carried by the lift cylinders despite an eccentrical load in the container. This, of course, results from the rigid mechanical connections of the U-shaped lever arms between the lift cylinders.

In addition, a longitudinal eccentric load compensating means is provided which comprises pairs of arm members 156 and 158 rigidly secured to the pairs of shafts 92 and 94 and pivotally interconnected between the respective ends thereof by a pair of links 160. The angular relationship shown in FIG. 2 between each arm 156 and 158 and the connecting link 160 is existent on each side of the vehicle and has been found to be a substantially optimum one for effecting an approximate equal distribution of the container load longitudinal of the vehicle even though the load in the container is eccentric. It will be apparent from observation to persons skilled in the art that a portion of the load which may be offset to the front or rear of the vehicle relative to the transverse center line of the lifting frame will be effectively shifted to the lesser loaded end thereof through the action of the said pairs of arms and links which act upon the pairs of shafts 92 and 94 to which they are secured to effectively shift the load as aforesaid.

The vehicle 10 may be utilized in any van container terminal or railroad yard or other container handling operation. If desired, dual controls may be used at the operator's station so that the operator is always facing in the direction of travel. From the operator's vantage point at the one corner of the machine he is able to maneuver the vehicle readily to engage a container by straddling the latter and driving the vehicle to embrace to container within the open bay with the lifting frame 24 elevated above the container. When the lifting frame is aligned with the container top it is lowered to engage latching devices 127 in the corner castings 128, at which time a positive locking engagement occurs controllable by the operator by mechanism not shown, and releaseable at the point of deposit. As described above, rigid bars 130 and 132 are adjustable lengthwise by cylinders 134 and 136 to either shift the lifting frame transversely in one direction or the other or to rotate or skew it in either direction in order to accurately align latching devices 127 with corner castings 128. Following engagement the container is elevated by retraction of lift cylinders 112 and 113 which may elevate to a maximum height the lifting frame as shown in broken lines in FIG. 2. Containers of standard dimensions may be deposited at ground level, on transport vehicles such as trucks or rail cars, or in storage yards on top of other containers or on an elevated dock.

Although I have described and illustrated a preferred embodiment of my invention, it will be understood by those skilled in art that modifications may be made in the structure, form and relative arrangement of parts without necessarily departing from the spirit and scope of the invention. Accordingly, it should be understood that I intend to cover by the appended claims all such modifications which fall within the scope of my invention.

I claim:

1. A load handling vehicle comprising a horizontally extending U-shaped frame forming an open bay for embracing a load to be engaged by the vehicle, transversely spaced hoist motor means supported from opposite legs of the U-shaped frame, and a pair of generally U-shaped lifting arm means extending longitudinally and transversely of the open bay and disposed in open pocket facing relation such that each pair of longitudinally adjacent legs thereof are operatively connected to the hoist motor means on one side of the vehicle.

2. A load handling vehicle as claimed in claim 1 wherein each of said U-shaped lifting arm means comprises a lever the transversely spaced legs of which are pivoted from transversely spaced parts of the vehicle legs, said pair of lifting arm means moving arcuately together in opposite directions in the open bay of the vehicle when pressure fluid is directed to the hoist motor means.

3. A load handling vehicle as claimed in claim 1 wherein a generally horizontal lifting frame depends from said pair of lifting arm means which extends longitudinally of the open bay and is adapted to engage van containers and the like embraced within the open bay, said pair of lifting arm means being actuatable arcuately in opposite directions to elevate the lifting frame in a generally horizontal plane.

4. A load handling vehicle as claimed in claim 3 wherein operator controlled lifting frame adjustment means is connected between each end of the lifting frame and the adjacent end of the lifting arm means.

5. A load handling vehicle as claimed in claim 4 wherein said adjustment means may be energized to shift said lifting frame transversely of said open bay or to actuate said lifting frame in a rotative or pivotal motion, whereby to align said lifting frame with a van container to be engaged.

6. A load handling vehicle as claimed in claim 1 wherein each of said lifting arm means tends to compensate for loads asymmetric in a direction transverse of the vehicle by effectively shifting a portion of the asymmetric load from the most heavily loaded side of the vehicle to the opposite side thereof.

7. A load handling vehicle as claimed in claim 1 wherein a pair of longitudinally spaced, transversely extending pivot shafts are supported from each leg of the U-shaped frame, the legs of each U-shaped lifting arm means being supported for pivotal movement from each transversely spaced coaxial pair of pivot shafts, and link and lever means interconnecting each longitudinally spaced pair of pivot shafts for mechanically shifting an asymmetric load portion longitudinally from a more heavily loaded end of the vehicle to a less heavily loaded end thereof.

8. A load handling vehicle comprising a horizontally extending U-shaped frame forming an open bay for embracing a load to be engaged by the vehicle, a pair of transversely spaced cylinder-piston means supported from opposite legs of the U-shaped frame, a pair of longitudinally spaced and transversely extending pivot shafts supported from and above each leg of the frame, a pair of generally U-shaped lifting arm assemblies which extend longitudinally of the open bay of the vehicle in open facing relation to each other and each of which has the legs thereof mounted on one pair of the transversely spaced pairs of pivot shafts in such a manner that the pair of lifting arms together form a pair of U-shaped first-class lever means forming oppositely arcuately actuatable lifting means, said cylinder-piston means being operatively connected to the adjacent opposed ends of the legs of the lever arms, and a longitudinally extending lifting frame located in a generally horizontal plane, supported from the lifting arms and elevatable thereby in a generally horizontal plane during arcuate movement of the lifting arms, said lifting frame being adapted to engage van containers and the like embraced within the open bay of the vehicle.

9. A load handling vehicle as claimed in claim 8 wherein means is connected operatively between the lifting arms and the lifting frame for adjusting the position of the lifting frame in a horizontal plane relative to the lifting arms.

10. A load handling vehicle as claimed in claim 8 wherein linkage means is connected between each longitudinally spaced pair of pivot shafts in order to compensate for asymmetric loads carried by the lifting frame.

11. A wheeled vehicle comprising a horizontally extending U-shaped frame forming an open bay for embracing a load to be transported by the vehicle, said vehicle having a fixed wheel base a pair of transversely spaced hoist motor means mounted upon opposite legs of the U-shaped frame, and a forwardly extending lifting arm and a rearwardly extending lifting arm pivoted from each leg of the U-shaped frame and on opposite sides of the adjacent hoist motor means both said lifting arms on each side being connected to the respective hoist motor means for actuation arcuately in opposite directions, said pairs of lifting arms being adapted to be operatively connected to a load to be engaged and transported by the vehicle.

12. A wheeled vehicle as claimed in claim 11 wherein a load engaging frame is supported from the remote end portions of the pairs of lifting arms and is adapted to be actuated vertically thereby in a horizontal plane.

* * * * *